J. F. BOGLE.
PIPE LIFTER.
APPLICATION FILED APR. 7, 1915.
1,154,687.
Patented Sept. 28, 1915.
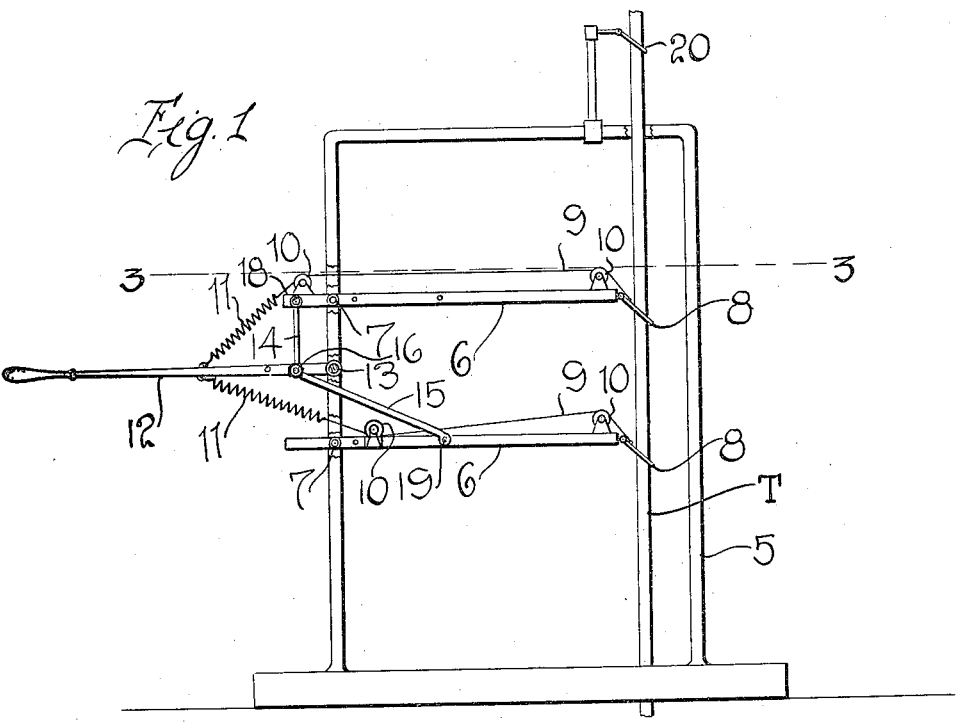
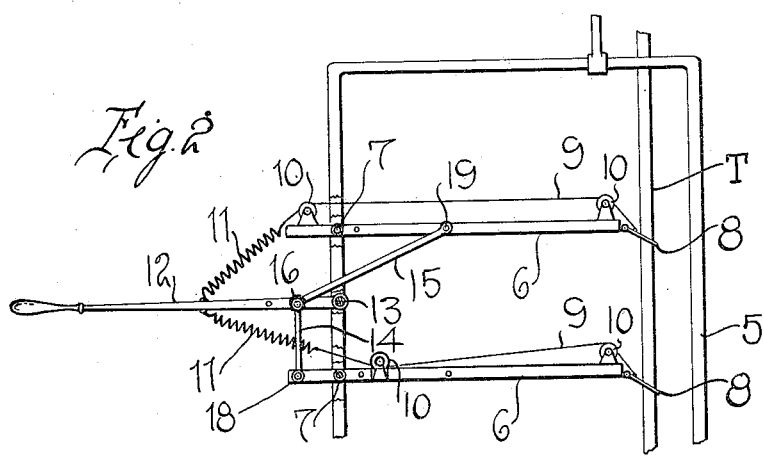
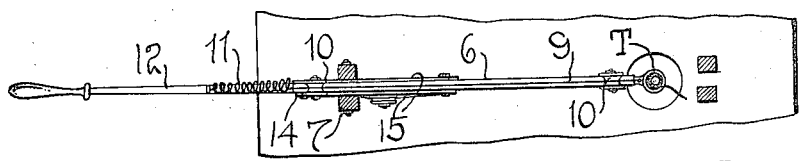
Inventor
J. F. Bogle
By Watson E. Coleman
Attorney

UNITED STATES PATENT OFFICE.

JOHN F. BOGLE, OF BUSHNELL, NEBRASKA.

PIPE-LIFTER.

1,154,687.  Specification of Letters Patent.  Patented Sept. 28, 1915.

Application filed April 7, 1915. Serial No. 19,825.

*To all whom it may concern:*

Be it known that I, JOHN F. BOGLE, a citizen of the United States, residing at Bushnell, in the county of Kimball and State of Nebraska, have invented certain new and useful Improvements in Pipe-Lifters, of which the following is a specification, reference being had to the accompanying drawings.

This invention relates to improvements in pipe lifters, and has for its primary object to provide a simply constructed and easily operated device of this character for extracting pipes from wells or lowering the same therein.

The invention has for a more particular object to provide a suitable supporting frame, a pair of levers pivotally mounted therein adjacent one of their ends and provided upon their other ends with clutch members or gripping dogs to receive the pipe, and an operating lever provided with reversible means adapted to be connected at its extremities to said first named levers to oscillate the same and raise or lower the pipe.

It is a further object of my invention to provide improved means for releasing the gripping dog or clutch on one of the oscillating levers from gripping engagement with the pipe so that in the movement of the other lever, the dog carried thereby will effectively grip the pipe and move the same in the desired direction.

With the above and other objects in view, my invention consists in the novel features of construction, combination, and arrangement of parts to be hereinafter more fully described, claimed, and illustrated in the accompanying drawing, in which, Figure 1 is a side elevation illustrating a pipe lifting device constructed in accordance with the preferred embodiment of my invention; Fig. 2 is a similar view showing the lever connecting brace member in its reverse position, whereby the pipe may be lowered into the well; and Fig. 3 is a section taken on the line 3—3 of Fig. 1.

Referring in detail to the drawing, 5 designates a suitable upright frame which is mounted at its lower end in any suitable manner upon the well platform. Upon one of the vertical uprights of this frame, horizontally disposed spaced levers 6 are pivotally mounted adjacent one of their ends, as indicated at 7, for oscillatory movement.

To the opposite end of each of the levers 6, a pipe gripping dog or clutch 8 is pivotally connected. Each of these dogs is preferably in the form of a metal loop through which the pipe, shown at T, extends. To each of the clutch dogs 8, adjacent to its inner end, one end of a rope or cable 9 is attached, said cable extending over the guide sheaves or pulleys 10 which are mounted upon the respective levers 6. To the other end of each of these cables, one end of a coil spring 11 is secured, while the opposite ends of said springs are suitably attached to an operating lever 12.

One end of the lever 12 is pivoted, as at 13, upon the upright of the frame 5. Brace rods 14 are pivotally connected at one of their ends to the lever 12 adjacent to its pivot, and have their other ends pivoted to the upper lever 6. Similar, relatively long brace rods 15 are also pivotally connected to the lever 12 at the same point and have their other ends pivotally connected to the lower lever 6 on the opposite side of the fulcrum 13 of the operating lever and with respect to the corresponding ends of the brace rods 14. These brace rods are arranged in pairs and disposed upon opposite sides of the lever 6 to which they are pivotally connected by means of the bolts, indicated at 18 and 19, respectively. As shown in Fig. 1 of the drawing, the rods 14 and 15 are connected to the levers 6 to lift the pipe from the well. It will be apparent that, upon a manipulation of the lever 12, in the upward movement of the same, the spring 11 exerts a pull upon the cable 9 and lifts the clutch dog 8, mounted upon the end of the lower lever 6, from gripping engagement with the pipe T so as to release the pipe and permit of its free sliding movement through said dog. The brace rods 15, connected to the lower lever, will force said lever upwardly at its inner end and, as the clutch dog on this lever is in gripping engagement with the pipe T, it will be manifest that said pipe will be elevated or lifted. Upon reversing the movement of the operating lever, the upper clutch dog will grip the pipe and hold the same against a downward movement while the lower clutch dog will release and slip downwardly upon the pipe to obtain another grip or purchase thereon. Upon the top of the frame 5, an additional clutch dog, indicated at 20, is suitably mounted, so that the sections of the pipe can be conveniently disconnected one from the other without releasing the section which extends through the gripping dogs 8.

When it is desired to lower the pipe into the well, the operator reverses the positions of the brace rods 14 and 15, as shown in Fig. 2, and connects the shorter rod 14 to the outer end of the lower lever 6 while the longer rods 15 are connected to the uppermost lever. It is, therefore, apparent that when the lever is now manipulated, the reverse of the above operation will take place or, in other words, in the upward movement of the lever, the lower dog 8 will be released while the inner end of the upper lever 6 will be moved downwardly by the longer brace 15 so that the pipe will be lowered into the well. In this manner, it will be seen that the well pipe may be very easily and quickly lifted from the well or replaced therein.

The invention is highly serviceable and convenient in practical use and may be readily manipulated by one man with a minimum of manual labor. Owing to the extreme simplicity of the device, it will be seen that the same can be produced at small manufacturing cost and is extremely strong and durable in practical use.

While I have shown and described the preferred construction and arrangement of the several parts employed, it will be understood that the invention is susceptible of considerable modification therein and I, therefore, reserve the privilege of resorting to all such legitimate changes as may be fairly embodied within the spirit and scope of the invention as claimed.

Having thus fully described my invention, what I desire to claim and secure by Letters Patent is:—

A pipe lifting mechanism including spaced lifting levers pivotally mounted adjacent to one of their ends, clutch dogs on the other ends of said levers for gripping engagement with a pipe, a cable connected to each of said dogs, guides for said cables mounted on the levers, an operating lever pivoted at one of its ends, springs connecting the other ends of said cables to the operating lever whereby the gripping dogs are alternately released when the operating lever is manipulated, relatively long and short brace rods having a common point of pivotal connection to said lever in spaced relation to its fulcrum and adapted for reversible pivotal connection to the lifting levers, the shorter rods being disposed at one side of the pivot of the lifting lever and contiguous thereto and the longer brace rods being connected to the other lifting lever at a point at a relatively greater distance from its pivot whereby the pipe may be raised or lowered when the operating lever is manipulated.

In testimony whereof I hereunto affix my signature in the presence of two witnesses.

JOHN F. BOGLE.

Witnesses:
 FRED PICKETT,
 IVAN HOOKS.

Copies of this patent may be obtained for five cents each, by addressing the "Commissioner of Patents, Washington, D. C."